Figure 1:
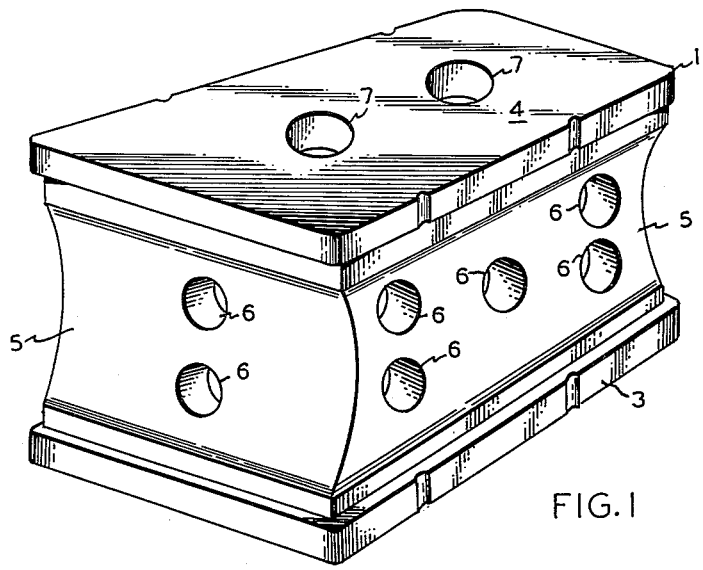

July 30, 1963    L. W. SANTHANY    3,099,063
SANITARY WARE SETTER

Filed Oct. 18, 1962    2 Sheets-Sheet 1

INVENTOR.
Leland W. Santhany
BY
ATTORNEY

July 30, 1963  L. W. SANTHANY  3,099,063
SANITARY WARE SETTER

Filed Oct. 18, 1962  2 Sheets-Sheet 2

INVENTOR.
Leland W. Santhany
BY
ATTORNEY

3,099,063
Patented July 30, 1963

1

3,099,063
SANITARY WARE SETTER
Leland W. Santhany, Tyler, Tex., assignor to Ferro Corporation, Cleveland, Ohio, a corporation of Ohio
Filed Oct. 18, 1962, Ser. No. 231,343
11 Claims. (Cl. 25—153)

This invention relates generally to ceramic refractory furniture for supporting ceramic ware during the firing thereof, and more particularly to improvements in a refractory setter for supporting sanitary ware during firing thereof.

Relatively heavy, bulky ceramic sanitary ware pieces, such as water closet bowls, water boxes, et cetera, having recessed areas which tend to be masked from the heat source during firing, this frequently resulting in their emerging from the kiln having certain such masked portions underfired.

For example, certain portions of the tortuous trap and recessed portion of the support bracket of a water closet bowl, normally supported on its bracket during firing, will frequently be underfired due to lack of circulation through said trap, with a consequential retardation of the flow of heat from the kiln atmosphere into, and through said trap, by convection.

A similar situation obtains in a water box fired while supported on its unglazed bottom, frequently resulting in distortion of said bottom.

Heretofore, the accepted practice for firing sanitary ware has been to support a rather expensive, massive, heavy-duty silicon carbide slab on a separable pedestal support. That is, heavy silicon carbide slabs were placed on the kiln car top, on which would be placed suitable pedestals, upon which, in turn, additional silicon carbide slabs would be placed to provide a sanitary ware setting, the sanitary ware pieces to be fired then placed on the surface of the top slab.

This system has the disadvantages of being expensive because of the silicon carbide slabs involved, time consuming in that the setting for each car must literally be built up prior to each firing, as well as comprising an inefficient means for circulating heat to the interior of recessed portions of sanitary ware pieces sitting on the top silicon carbide slab.

In view of the foregoing, and because of the relatively great weight and mass of the ceramic, sanitary ware bodies involved (as compared to wall tile, etc.) a single, unitary type setter has never been considered practical for this particular application.

I have however found that a single, unitary type setter for sanitary ware is not only feasible, but provides a number of surprising advantages over the methods heretofore used.

It is therefore an object of this invention to provide a unitary setter for sanitary ware.

It is further an object of this invention to provide a one piece, unitary setter for sanitary ware having an improved means for circulating heat by convection to recessed portions of said sanitary ware.

It is also an object of this invention to provide a reversible refractory setter for sanitary ware.

It is further an object of this invention to provide a setter for sanitary ware which enables kiln car settings to be more quickly and easily made, and which is less expensive than previous methods of setting.

Other related objects inherent in this invention will readily appear as the following disclosure progresses.

Figure 3:
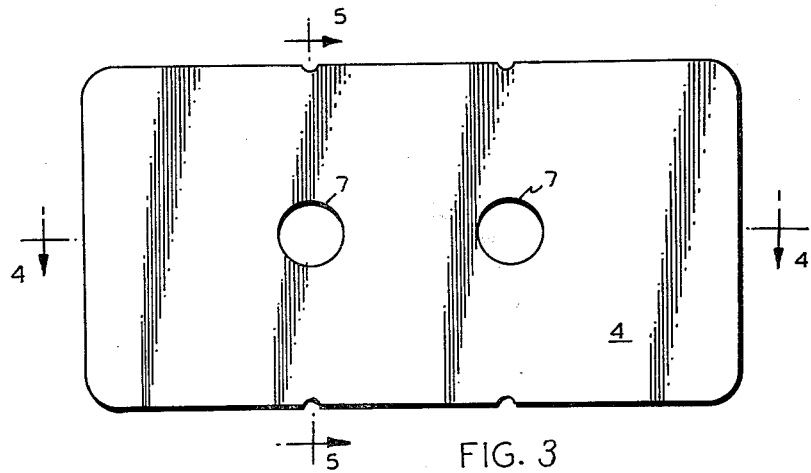
Figure 2:
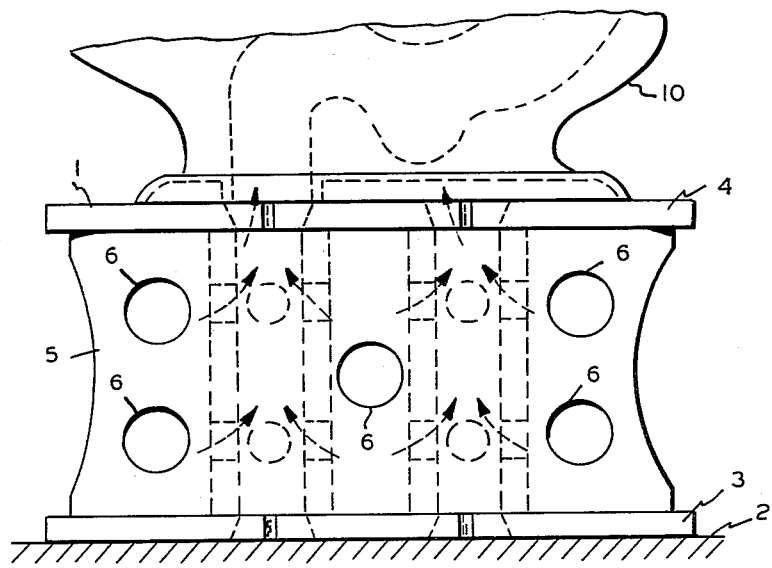
Figure 4:
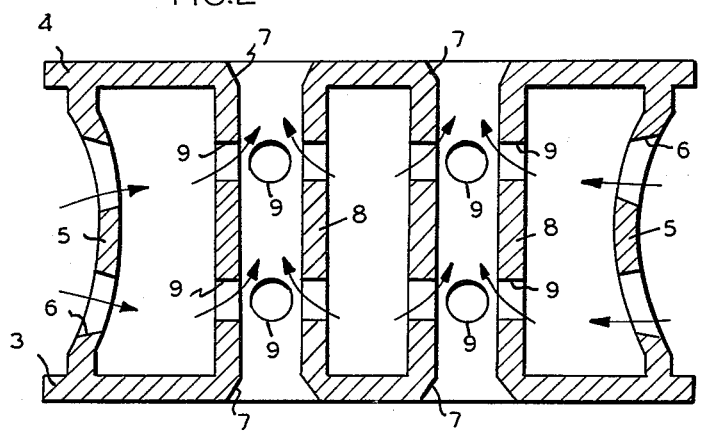
Figure 5:
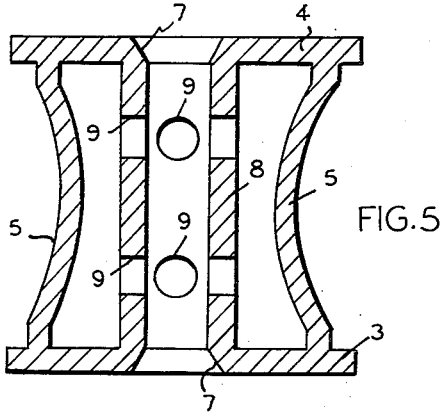

In the drawings illustrating a preferred embodiment of my invention:

FIG. 1 is a perspective view of my novel setter;
FIG. 2 is a side elevation view of the setter depicted in FIG. 1 showing a water closet bowl carried by said setter, in turn carried by the refractory top of a kiln car;
FIG. 3 is a plan view of the setter depicted in FIG. 2;
FIG. 4 is a section through the line 4—4 of FIG. 3;
FIG. 5 is a section through the line 5—5 of FIG. 3.

Referring more specifically to the attached drawings, FIG. 2 shows my novel setter designated generally by the reference numeral 1, resting on the refractory top of a kiln car designated generally by 2.

The setter consists in a base 3, and a ware bearing member 4, maintained in substantially parallel spaced relationship with respect to said base by concave webs 5 disposed generally adjacent the outer periphery of base 3 and ware bearing member 4.

Referring to FIGS. 1, 2 and 4, it will be seen that the end construction of the setter is essentially the same as that of the side construction, and also consists of a web 5. Openings 6 extend through all webs as shown, in generally opposed relationship to encourage passage of heat from the kiln atmosphere into the area between base 3 and ware bearing member 4. It will be seen that tubular members 8 act as columnar supports for the central portions of ware bearing member 4, said tubular supports having passages centrally situated therewithin communicating directly with openings 7 in ware bearing member 4.

From FIGS. 2 and 4, it will be seen that tubular members 8 have additional passages 9 through their sides, communicating with the interior passage of said tubes, and the area between the ware bearing member 4 and base 3.

Referring to FIG. 2, it will be seen that the water closet bowl, depicted generally by the numeral 10 is set with the discharge opening of its trap generally coincident with openings 7 through ware bearing member 4.

Thus, in practice, when a piece such as water closet bowl 10 is placed upon the ware bearing surface of ware bearing member 4, with its recessed portion (trap discharge opening and recessed underside of support bracket) coincident with the openings 7, in said ware bearing member, which communicate with the area between the base 3 and ware bearing member 4 via passages 9 in tubular members 8, as indicated by the arrows in FIGS. 2 and 4, there is provided adequate opportunity for convection currents to carry heat from the kiln atmosphere into the area between base 3 and ware bearing member 4, via passages 6, thence through passages 9 into the interiorly situated passage the length of tube 8, thence through openings 7 through wear bearing member 4, to the area immediately above the ware bearing surface of ware bearing member 4, which, in the embodiment depicted, comprises the recessed portion of water closet bowl 10, represented by its trap, trap discharge opening and recessed support bracket.

As will further be seen from FIGS. 1 and 2, my preferred embodiment is symmetrical with respect to a horizontal plane midway between base 3 and ware bearing member 4, enabling the setter to be made fully reversible, member 4 being disposed vertically, essentially directly above base 3, and coinciding in general outline therewith, enabling the base to be utilized as a ware bearing member and vice versa.

The components of my setter may be produced from any suitable refractory material, utilizing conventional methods, and fired in a high temperature kiln to provide a solid, one piece unitary setter embodying all the features set forth above.

Although not shown, it will be readily apparent that, following conventional setting procedures, a water closet tank may be set upright on its bottom, with lid in place, so that its bottom, unglazed portion, rests over openings 7 to achieve more uniform and complete firing of said bottom, which, when fired using previous setting means, frequently distorted.

In my preferred embodiment, concave webs 5 have been utilized as support means for maintaining base 3 and ware bearing member 4 in substantially parallel spaced relationship in order to provide added strength, and to permit heat circulation between and through setters, even when they are placed in side-to-side or end-to-end abutting relationship during firing in a kiln.

Furthermore, the concave webs appear to add strength and stability to the setter inasmuch as a straight, vertical web support, on all four sides, may have a tendency to warp outwardly, rather than inwardly, during firing of sanitary ware, thus promoting a greater tendency toward setter failure. The concave webs as shown in my preferred embodiment will undergo a tendency to distort, if at all, toward the interior of the setter, but which tendency toward distortion is counteracted by the abutting relationship of the concave web of one side, at its point of junction with webs on the adjacent sides.

It will be readily apparent that tubular members 8 serve a dual function, namely providing a means of firm support for the central portion of ware bearing member 4, particularly in the vicinity of openings 7, and further provide a means for directing heat by convection, from the kiln atmosphere, into recessed portion of a sanitary ware piece placed over opening 7.

With respect to the built-up, silicon carbide slabs discussed above, previous attempts to create openings in the top, ware supporting, silicon carbide slab have been unsuccessful as it has been impossible to secure firm, solid support of the slab in the vicinity of the opening therethrough, in a setting which is built up on the car, causing the silicon carbide slab to develop cracks in the vicinity of the opening therethrough, thus shortening its useful life and adding to the expense involved in utilizing this type setting.

Having thus described the preferred embodiment of my invention, which is to be considered illustrative only, and in no way a limitation upon the innumerable ramifications of the principle of my invention without departing from the spirit or scope thereof, I therefore particularly point out and distinctly claim as my invention:

1. A refractory firing pedestal setter for supporting ceramic ware during firing thereof in a kiln, said setter having a generally horizontal base member, a generally horizontal ware bearing member having a ware bearing surface, said ware bearing member disposed above, and in generally parallel spaced relationship to said base, means disposed adjacent the periphery of said base for supporting said ware bearing member in said generally parallel spaced relationship to said base, said ware bearing member having an opening therethrough communicating with said ware bearing surface thereof and with the area between said ware bearing member and said base, a second support means for supporting said ware bearing member in the vicinity of said opening, a third means coacting with said opening and said second support means for permitting movement, by convection, of heat from the aforementioned area between said ware bearing surface and said base, to the area immediately above said ware bearing surface, via said opening.

2. The pedestal of claim 1 wherein said refractory were bearing surface and said base have substantially the same configuration, said ware bearing member disposed vertically generally coincident with said base and said first mentioned means as a series of concave refractory webs.

3. The refractory pedestal of claim 1 wherein said ware bearing member has an outline substantially the same as that of said base, said ware bearing member disposed vertically generally coincident with said base, said first mentioned means are concave refractory webs, said second support means is a hollow tube having a centrally situated passage communicating with said opening, and said third means is a passage through the side of said tube communicating with said centrally situated passage of said tube.

4. A refractory firing pedestal setter for supporting ceramic ware during firing thereof in a kiln having a generally plannular horizontal base member, a generally plannular horizontal ware bearing member having a ware bearing surface, said ware bearing member disposed above, and in generally parallel spaced relationship to, said base, said ware bearing member having an opening therethrough communicating with said surface thereof and with the area between said ware bearing member and said base, means disposed adjacent the periphery of said base for supporting said ware bearing member in said generally parallel spaced relationship to said base, a second support means for supporting said ware bearing member in the vicinity of said opening, a third means coacting with said first mentioned means to permit circulatory movement, by convection, of heat from said kiln atmosphere into the area between said ware bearing member and said base, and a fourth means coacting with said opening and said second support means for permitting movement, by convection, of heat from the aforementioned area between said ware bearing member and said base, to the area immediately above said ware bearing surface via said opening.

5. The pedestal of claim 4 wherein said base and said ware bearing member have generally the same configuration, said ware bearing member is disposed vertically coincident with said base, and said first mentioned means are concave webs.

6. The pedestal of claim 4 wherein said ware bearing member and said base have generally the same configuration, said ware bearing member is disposed vertically coincident with said base, said first mentioned means are concave webs, said second support means are hollow tubes having a passage therethrough communicating with said opening, and said third means is an opening through side webs communicating with said area between said base and said ware bearing member.

7. The pedestal of claim 4 wherein said ware bearing member and said base have generally the same configuration, said ware bearing member is disposed vertically coincident with said base, said first mentioned means are concave webs, said second support means is a hollow tube having a centrally situated passage therethrough communicating with said opening, said third mentioned means is an opening through said webs communicating with said area between said base and said ware bearing member, and said fourth means is an opening through the side of said tube communicating with its centrally situated passage.

8. The pedestal of claim 1 wherein said setter is substantially symmetrical with respect to a horizontal plane midway between said ware bearing member and said base, thereby permitting said ware bearing member to be used as said base and vice versa, to provide a reversible setter.

9. The pedestal of claim 4 wherein said setter is substantially symmetrical with respect to a horizontal plane midway between said ware bearing member and said base, thereby permitting said ware bearing member to be used as said base and vice versa, to provide a reversible setter.

10. The pedestal of claim 8 comprising a single, unitary structure.

11. The pedestal of claim 9 comprising a single, unitary structure.

References Cited in the file of this patent

UNITED STATES PATENTS

| | | |
|---|---|---|
| 756,300 | Underwood | Apr. 5, 1904 |
| 1,215,067 | Simonds | Feb. 6, 1917 |
| 1,333,381 | Brain | Mar. 9, 1920 |
| 1,744,185 | Write et al. | Jan. 21, 1930 |
| 3,066,449 | Cramer | Dec. 4, 1962 |

FOREIGN PATENTS

| | | |
|---|---|---|
| 1,062,615 | Germany | July 30, 1959 |